United States Patent [19]
Teitelbaum

[11] Patent Number: 5,872,834
[45] Date of Patent: Feb. 16, 1999

[54] TELEPHONE WITH BIOMETRIC SENSING DEVICE

[75] Inventor: Neil Teitelbaum, Ottawa, Canada

[73] Assignee: Dew Engineering and Development Limited, Ottawa, Canada

[21] Appl. No.: 714,614

[22] Filed: Sep. 16, 1996

[51] Int. Cl.$^6$ ................................................ H04M 11/00
[52] U.S. Cl. ............................ 379/93.03; 379/110.01; 379/201; 382/115
[58] Field of Search .......................... 379/91.01, 91.02, 379/93.01–93.03, 93.05, 93.08, 93.12, 93.23–93.28, 110.01, 201; 382/115, 116, 124

[56] References Cited

U.S. PATENT DOCUMENTS

| | | | |
|---|---|---|---|
| 4,236,068 | 11/1980 | Walton | 235/380 |
| 4,680,785 | 7/1987 | Akiyama et al. | |
| 4,759,056 | 7/1988 | Akiyama | |
| 5,140,626 | 8/1992 | Ory | 379/201 |
| 5,299,256 | 3/1994 | Hu | 379/93.23 |
| 5,414,755 | 5/1995 | Bahler et al. | 379/67 |
| 5,465,290 | 11/1995 | Hampton et al. | 379/67 |
| 5,557,665 | 9/1996 | Yamamoto | 379/198 |
| 5,559,504 | 9/1996 | Itsumi et al. | 382/115 |
| 5,613,012 | 3/1997 | Hoffman et al. | 382/115 |

FOREIGN PATENT DOCUMENTS

| | | |
|---|---|---|
| 2 678 821 | 1/1993 | France . |
| 63-272249 | 11/1988 | Japan . |
| 4-258074 | 9/1992 | Japan . |
| 5-48712 | 2/1993 | Japan . |
| 5-103068 | 4/1993 | Japan . |
| 5-95329 | 4/1993 | Japan . |
| 5-344217 | 12/1993 | Japan . |
| 2193419 | 2/1988 | United Kingdom . |

OTHER PUBLICATIONS

Tranlation of Oda, JP 5–344217.
Tranlation of Matsuda, 5–103068.
Tranlation of Akimoto, JP 4–258074.

*Primary Examiner*—Wing F. Chan
*Attorney, Agent, or Firm*—Neil Teitelbaum & Associates

[57] ABSTRACT

A telephone is provided with a biometric input sensor for receiving a biometric input and providing a signal in dependence upon said biometric input to the telephone network. Such a signal may identify an individual using certain telephone equipment. When used in conjunction with a public phone system, the telephone provides identification for billing, access privileges, and follow me call routing.

3 Claims, 11 Drawing Sheets

TELEPHONE WITH BIOMETRIC SENSING DEVICE

FIELD OF THE INVENTION

This invention relates generally to telephones and more particularly to a telephone provided with a contact imaging device for identifying an operator of the telephone.

BACKGROUND OF THE INVENTION

In the past, telephones were provided with handsets comprising a speaker, a microphone and a handle, dials or keys, ringers, and buttons to activate and deactivate the telephones. Such telephones are well suited to their intended purpose—communications.

Recently, telephones have been provided with added features and, therefore, require further input. For example, to use a voice mail system one accesses the system, selects a mail box, enters an identification code and listens to prerecorded messages. Each time the voice mail system is used, a "mailbox" and an identification code are required. As a further example, some pay phones are equipped with magnetic strip readers that read phone company issued cards and credit cards to allow billing of the card. As yet a further example, many telephones now have a feature called call display where an originating number is displayed at a receiving telephone prior to a connection being established; this allows for call screening, directing, and advanced preparation.

Another advent in telephone technology is the private broadcast switch. Switches such as these are installed in many hotels, campuses and businesses. Calling privileges are determined by extension number or telephone number. Features like call forward can be activated from anywhere and by anyone. Meeting rooms in businesses are often provided with teleconferencing equipment. Unfortunately, these same rooms are not provided with long distance privileges because they are easily accessible. Alternatively, they are kept locked, thereby reducing their usefulness. Further, a workstation having a telephone with a predetermined set of privileges allows anyone sitting at the work station (with or without authorization to do so) to use those privileges.

A current trend in telephone technologies is to extend customer features and access to those features in a fashion that allows for control, billing, and transparency. In an attempt to achieve these goals, a phone company has disclosed a method whereby a telephone number beginning with a "#" is dialed to identify a user wherever they may be. A further password or identification code is then required to ensure authorization. With such a system, users can move features to their current location. Unfortunately, identification codes are often not secure; requiring a user to enter 10 or 20 tones is not transparent.

OBJECT OF THE INVENTION

Thus, in an attempt to overcome these and other limitations of known prior art devices, it is an object of this invention to provide a telephone for transparently identifying its current user and transmitting the user's identifying information to a further system.

SUMMARY OF THE INVENTION

In a first broad embodiment the invention seeks to provide a telephone comprising communications means for establishing a communications link and allowing communication via said link; contact imaging means for accepting input biometric information and providing biometric data in dependence upon the biometric information; and transmission means for transmitting an indication in dependence upon the biometric data.

Alternatively, the telephone further comprises encoding means for encoding at least some of the biometric data and for providing encoded biometric data to the transmission means.

Alternatively, the telephone further comprises encryption means for encrypting at least some of the biometric data and for providing encrypted biometric data to the encoding means.

Alternatively, the telephone further comprises encryption means for encrypting at least some of the encoded biometric data and for providing encrypted biometric data to the transmission means.

Preferably, the transmission means transmits the indication via the link.

Alternatively, the transmission means comprises means for generating audible tones.

Alternatively, the contact imaging means is a fingerprint imaging means.

Alternatively, the communications means is a cellular telephone.

Alternatively, the communications means is a digital telephone.

In a further embodiment, the digital telephone is for use with a PBX.

In a further broad embodiment, the invention seeks to provide a telephone comprising communications means for establishing a communications link and allowing communication via said link; contact imaging means for accepting input biometric information and providing biometric data in dependence upon the biometric information; encryption and encoding means for encrypting and encoding at least some of the biometric data and for providing encoded encrypted biometric data; transmission means for transmitting an indication in dependence upon the encoded encrypted biometric data via the link.

In a further broad embodiment, the invention seeks to provide a telephone network for connecting at least a first telephone to at least a second telephone comprising: contact imaging means for receiving biometric input information and for providing biometric data to the first telephone; and a switch for establishing a communication link between at least a first telephone and the at least a second telephone and for providing features and enabling services in dependence upon received biometric data.

In a further embodiment the telephone network further comprises a second contact imaging means for receiving biometric input information and for providing biometric data to the second telephone.

Alternatively, the received biometric data is further used for identifying a user of the first telephone.

In a further broad embodiment, the invention seeks to provide a biometric input device for use with a communications means for establishing a communications link on a communications network and allowing communication via said link comprising: contact imaging means for accepting input biometric information and providing biometric data in dependence upon the biometric information; transmission means for transmitting an indication via the communications network and in dependence upon the biometric data; and connector means having at least two connectors and for connecting to at least the communications network and the communications means and for allowing the communications means and the transmission means to communicate via the network.

In yet a further broad embodiment, the invention seeks to provide a telephone comprising: communications means for establishing a communications link and allowing communication via said link; contact imaging means for accepting input biometric information and providing biometric data in dependence upon the biometric information; memory means for storing at least a biometric template; means for comparing the biometric data to at least a biometric template and for providing an enabling signal; and a communications enabling means for enabling or disabling at least some types of communications or some communication features in dependence upon the enabling signal.

Preferably, the storage means is a non-volatile storage means.

Alternatively, the storage means is also for storing data related to features associated with each of the at least a biometric template.

Alternatively, the communications means is a video phone.

Alternatively, the communications means is a wireless communications means.

Preferably, the contact imaging means is a fingerprint imager.

Alternatively, the communications enabling means is for enabling or disabling the communications means in dependence upon the enabling signal.

An advantage of the present invention is transparent identification of a user of a telephone for the purposes of enabling billing, call logging, voice mail access, email access, caller identification and other telephone features.

It would be advantageous to provide a telephone with a biometric information input device for identifying a user of the telephone to another telephone, a central telephone system, or PBX in order to enable and disable features based on user identification and not based on an extension or telephone number.

BRIEF DESCRIPTION OF THE DRAWINGS

Exemplary embodiments of the invention will now be described in conjunction with the following drawings, in which.

DETAILED DESCRIPTION OF THE INVENTION

According to this invention a telephone is provided having incorporated therein a contact imaging device. The contact imaging device allows for a user of the telephone to be identified transparent to said user or requiring little effort. Contact imaging devices are known to include electrical contact imaging sensors such as capacitive fingerprint imagers and optical contact imaging sensors such as optical fingerprint imagers. In use, a user of such a contact imaging device makes physical contact with an electrical or optical component of the imager.

Figure 1:
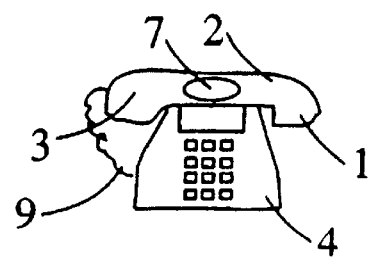
FIG. 1 is a simplified diagram of a telephone incorporating a contact imaging means according to the present invention.

Referring to FIG. 1, a telephone according to the present invention is shown. The phone comprises a handset 2 comprising a speaker section 1 and a microphone section 3. Adjacent the microphone section is a connecting wire 9 to connect the handset 2 to a wall outlet or to a telephone base 4. Located on the handset 2 is a contact imaging means 7 in the form of a fingerprint input device. The device is preferably located in a comfortable location for a finger tip to rest upon such as a handset handle.

Figure 2:
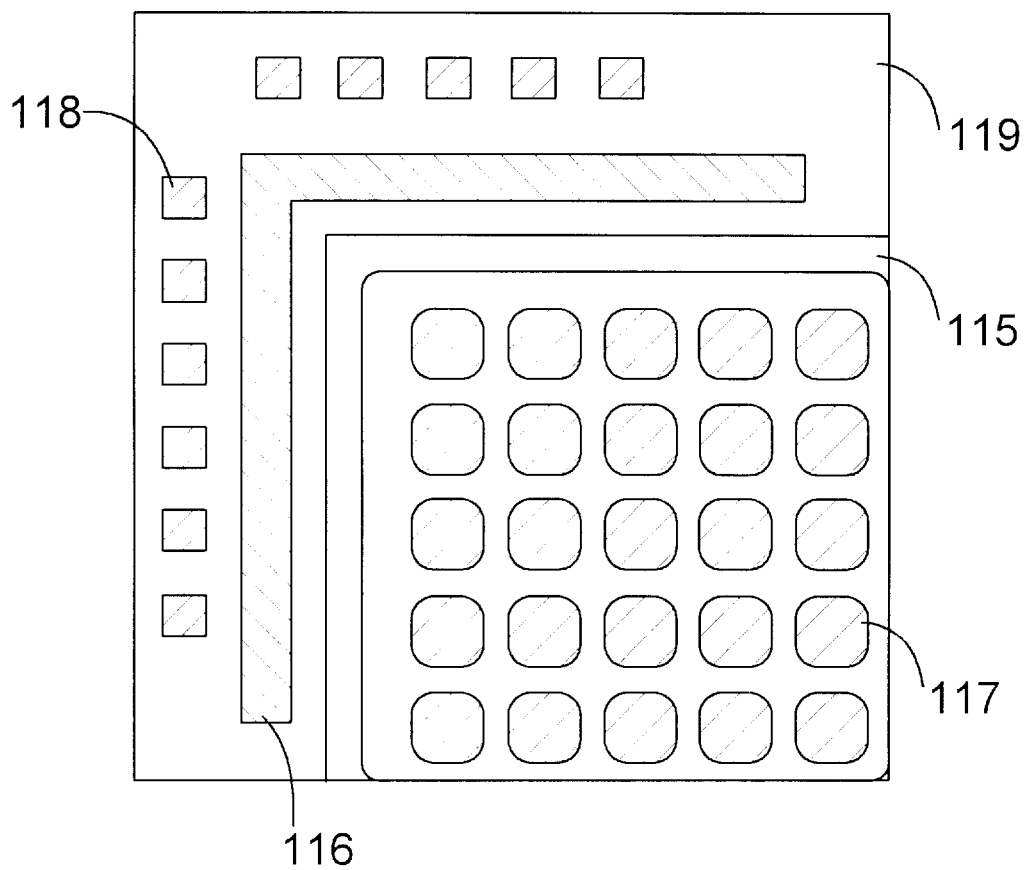
FIG. 2 is a simplified diagram of a sensing device for use with the present invention showing an array of sensing elements together with associated addressing circuitry.

Referring to FIG. 2, part of a sensing device for use in an embodiment of the present invention and implemented on a semiconductor chip is shown comprising a single active matrix addressed sensing pad 119 having an X-Y array of sense elements consisting of r rows (1 to r) with c sensing elements 117 in each row. In practice there may be about 300 rows and 200 columns of regularly-spaced elements occupying an area of approximately 2 cm×3 cm. This area is for accepting a fingertip for scanning. Should such a sensing pad 119 be made larger, it could be used for scanning other items such as a palm of a hand.

Sensor elements 117 are disposed in such a fashion that they are capable of distinguishing the smallest desired feature of a fingerprint. Preferably, the placement and spacing of the sensor elements allow an image of a fingerprint, once scanned, to contain all required features for analysis. With each sensing element 117 is smaller than half the smallest sensible feature size a suitable image is generated image. Empirical studies reveal that a square plate of about 50 $\mu$m edge length is suitable for fingerprint sensing. Although the apparatus is described with reference to an array of sensing elements 117 having substantially square shape, it is possible to use different configurations of sensing elements 117 such as concentric circles or a spiral and different shapes such as triangles, circles, or rectangles.

The array of sensing elements 117 is connected through an analog switch matrix to facilitate reading the fingerprint image out of the sensing array 119. Timing and sequencing logic 116 selects each element in the array in turn to produce a complete image of a fingerprint presented to the device. The signal may be output directly as an analog signal or may be converted to a digital signal prior to output from the device.

The sensing pad 119 further comprises a ground ring 115 and bonding pads 118 designed for connection to other components or to packaging. The ground ring 115 also serves to provide a common ground for the sensing pad. Accordingly, it is important that the ground ring 115 and integrated circuit elements be designed so as to minimize noise to each sensing element 117. The signal to noise ratio that is acceptable will vary between applications and should be adjusted to meet the needs of a specific design. When possible, packaging should be selected to limit noise.

Figure 3:
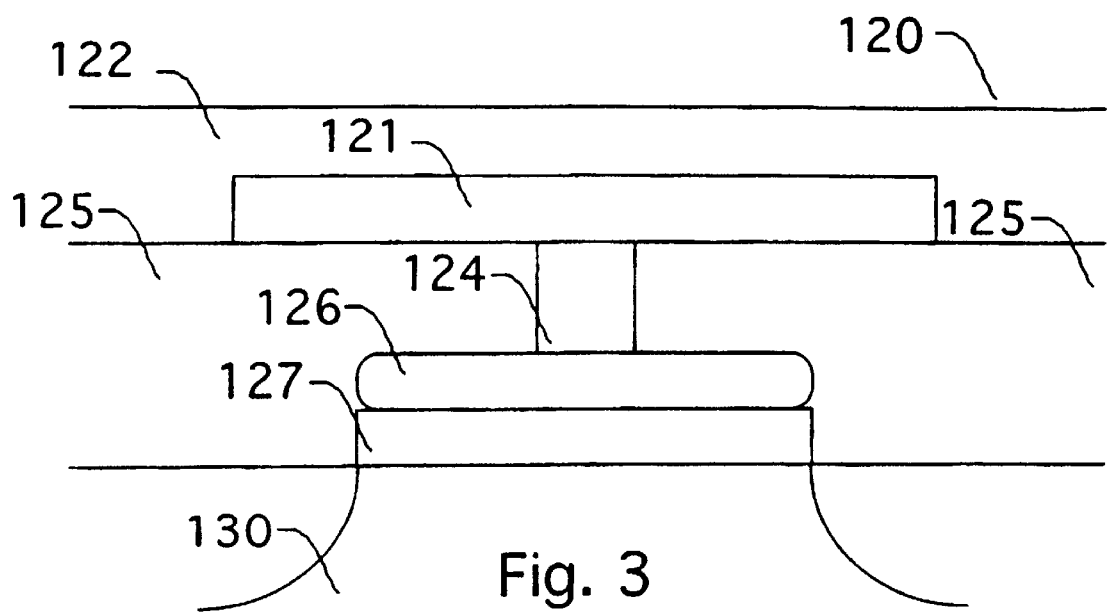
FIG. 3 is a simplified diagram of a sensing element for use with the present invention.

Referring to FIG. 3, a single sensing plate 120 is shown. Such a sensing plate 120 is designed to be used in arrays and preferably is smaller than half the smallest sensible feature size as indicated above. Charge sensing electrode 121 is connected to an active element which is shown as a three terminal switching device in the form of a field effect transistor (FET) having a source, a drain, and a gate 126. The gate 126 is connected to the sensing electrode 121 by an interconnect 124. Disposed between the gate 126 and the transistor 130 is a gate oxide 127. Such transistor configuration is known in the art.

Figure 4:
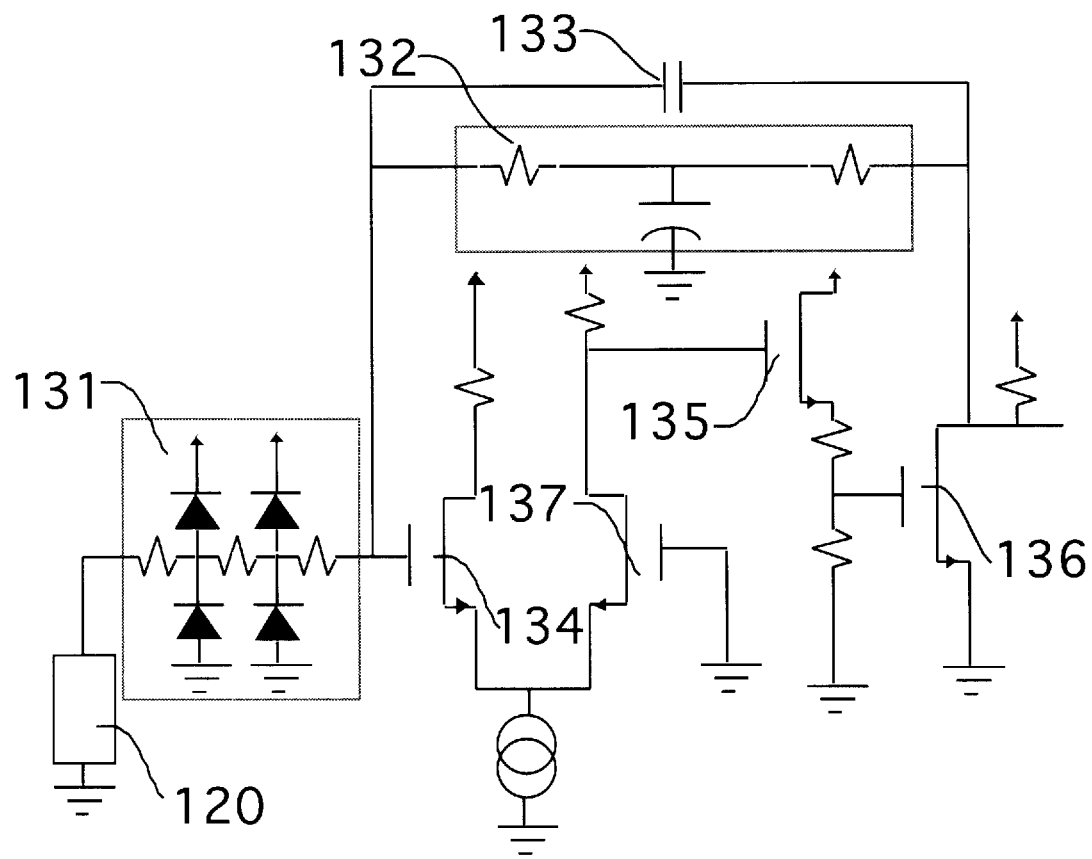
FIG. 4 is a schematic diagram of an amplifier circuit for use with the present invention.

Above the charge sensing electrode 121 is disposed an overglass 122 which serves to protect the charge sensing electrode 121 and to space the electrode and a fingertip presented thereto. Below the charge sensing electrode 121 is disposed a field oxide 125. A finger placed against the overglass 122 induces charge in the charge sensing electrode 121. By amplifying the charges induced by a fingertip on the charge sensing electrode 121 with an amplifier circuit such as is shown in FIG. 4, the induced charges can be rendered distinguishable.

Assuming that the charge density on the fingertip is substantially even, induced charges on the charge sensing electrode 121 will depend solely on the distance between the charge sensing electrode 121 and the skin of the fingertip inducing the charge. Further, as the induced charge falls off with the distance, the closest skin of the fingertip will induce a larger proportion of the charge. The sensor is employed in the above fashion to image fingertips.

Alternatively, the contact imaging means is in the form of a capacitive fingerprint scanner requiring precharging of the capacitive array. Capacitive fingerprint scanners are well known in the art and are commercially available.

The contact imaging means may be any suitable input device such as an optical fingerprint scanner, capacitive fingerprint scanner, palm scanner, or any other suitable device. Preferably, the contact imaging means is a low power, compact device for use with existing telephone power supplies.

In FIG. 1, the contact imaging means 7 is located on the side of the handset 2. Alternatively, the contact imaging means is on a bottom or top of the handset. Further alternatively, the contact imaging means is on a telephone base. Further alternatively, the contact imaging means communicates with the base in a fashion similar to that of the handset such as a wire, an RF wireless link, or an infrared wireless link.

Figure 5:
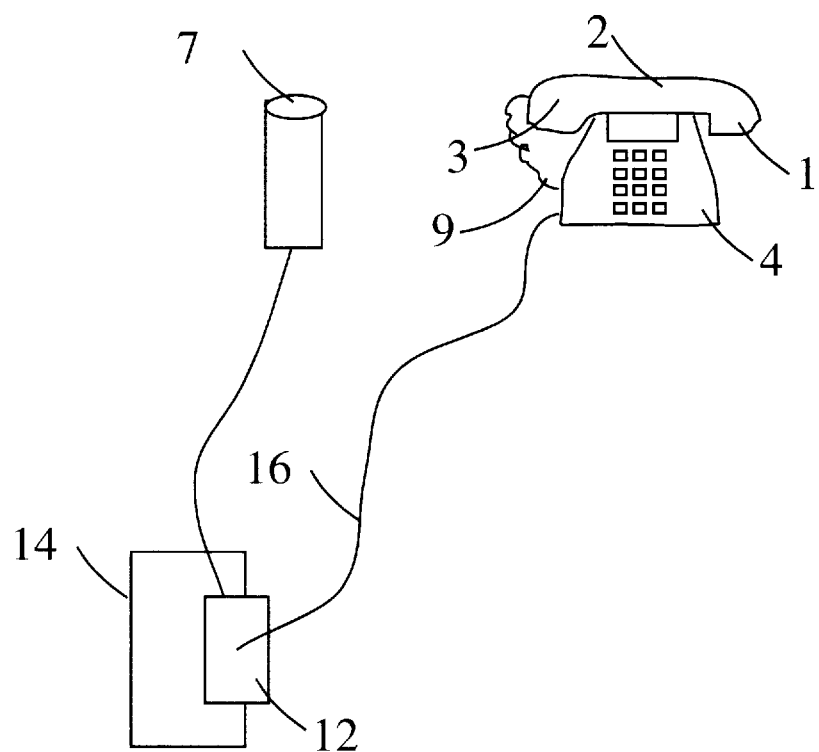
FIG. 5 is a simplified diagram of a contact imaging means for use with an existing telephone according to an embodiment of the invention.

FIG. 5 shows a telephone according to the prior art modified to work according to the present invention. A passthrough telephone outlet connector 12 for attaching to a telephone outlet 14 and for having a telephone cord 16 attached thereto is provided with a contact imaging means 7 attached thereto. The contact imaging means 7 draws power from a telephone line. Alternatively, the contact imaging means 7 is powered by another power source. The telephone, operates in its normal fashion. A user of the telephone may choose to identify themselves by providing biometric information in the form of a fingertip to the contact imaging means 7. The contact imaging means 7 is further provided with means for providing biometric data in dependence upon the biometric information and for encoding and transmitting the biometric data. In a further embodiment, the connector is also provided with means for detecting a status of the telephone (on hook, dialing, ringing, busy, off hook, etc.).

Figure 6:
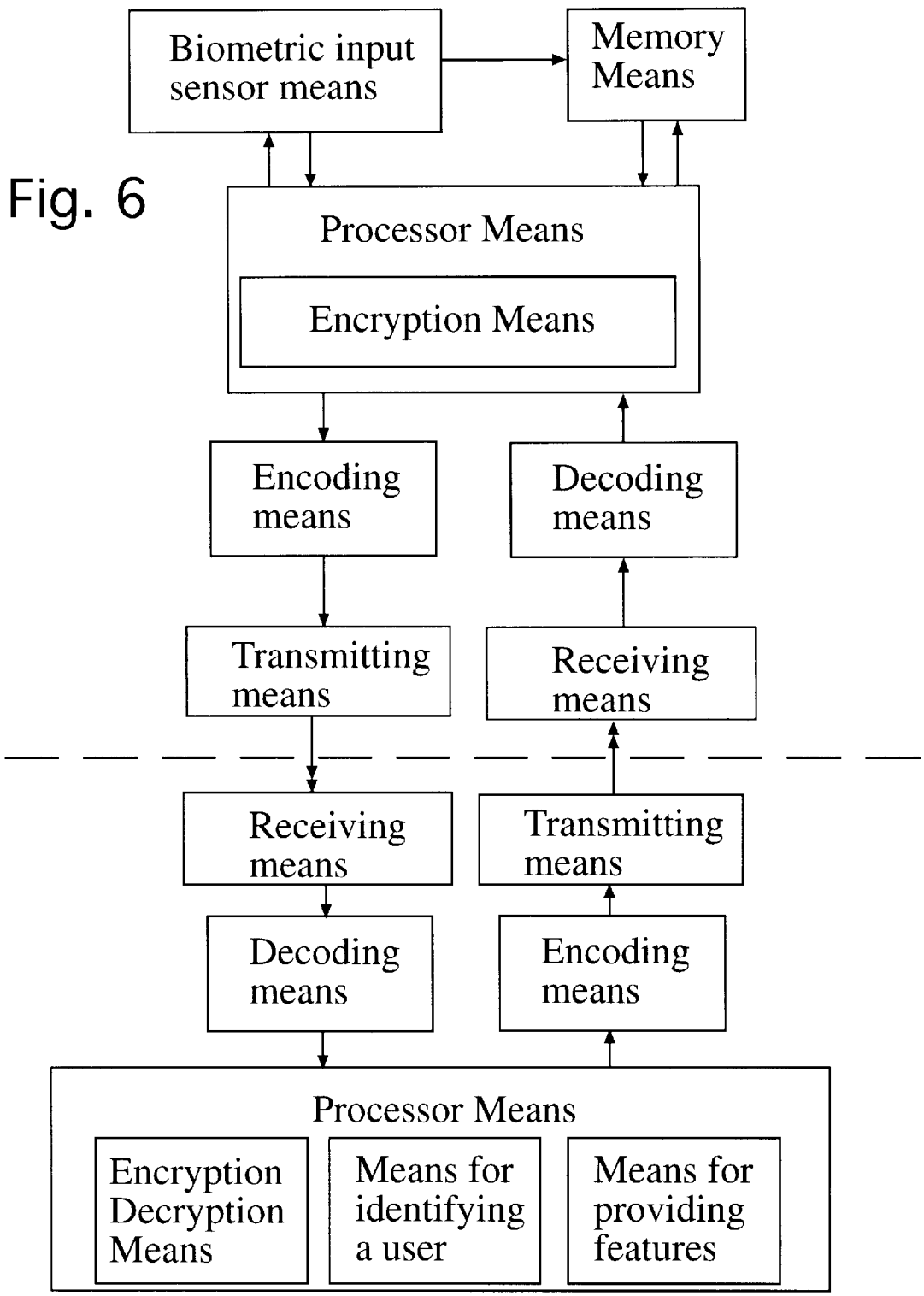
FIG. 6 is a block diagram of an embodiment of the invention.

An embodiment of the device is shown in FIG. 6. A contact imaging sensor means is located in a fashion wherein it receives biometric input information during normal telephone use. The biometric input information is transferred to a memory means and is transformed by a processor means into biometric data. Alternatively, as shown, the contact imaging sensor means communicates with the processor means to enable processor control of the contact imaging sensor means. For instance, the processor may be used to re-calibrate the sensor means and/or the sensor means may enable the processor means upon the application of biometric input information. In an embodiment, the biometric data is encrypted by encryption means located within the processor means. Alternatively, separate encryption means are used. Further alternatively, no encryption is employed. The encrypted biometric data is encoded for transmission. The encoded biometric data is in the form of a sequence of identifiable sounds. Alternatively the encoded biometric data is in the form of an electronic signal. The encoded biometric data is then sent along a network (indicated by a dashed horizontal line in FIG. 6) to a distant end where a receiving means of a central switch or server receives same. The received encoded biometric data is decoded by the decoding means. The decoded biometric data is decrypted by decryption means located within a processor means and the decrypted data is then used to identify a user of the distant phone. The identification is conducted by identification means within the processor means. In an embodiment, identification is achieved through a search of known biometric data or through comparisons with extracted features or templates of biometric information of known users. When the decrypted biometric data is of a known user, the user is said to be registered or recognised.

Once user identification is complete, the processor means within the server or the central switch provides the identification to a means for providing features. The means for providing features determines features that are to be provided to the user at a current user location and provides those features via a communication network.

In the embodiment shown in FIG. 6, means are provided for transmitting information from the processor means of the central switch or server to the processor means of the telephone and in conjunction with the encryption/decryption means enhance security. In a further embodiment the means for transmitting information from the processor means of the central switch or server to the processor means of the telephone are used to transmit information such as billing information, account status, medical information, etc.

The encoded biometric data in the form of tones is in the form of a common phone number such as those starting with 555 that are reserved for telephone company use followed by a set of tones representative of the keypad numbers and indicative of the biometric input. Alternatively, the encoded biometric data is in the form of other identifiable sequences that are different from phone numbers, features, or other common telephone signals. Further alternatively, the encoded biometric data uses other forms of electronic communication such as digital signaling or analogue signaling.

Preferably, the encoded biometric data is unique. When the encoded biometric data is not unique further information is requested from a processor within a telephone provided with a contact imaging device. This requires the telephone to support bi-directional communication of signaling. Of course, where a telephone is already provided with circuitry for bi-directional signaling and communications, this limitation is less important. When the purpose of identification is for billing, it is unnecessary to actually verify the user prior to processing a call as later identification of the encoded biometric data is possible; this requires encoded biometric data that is sufficiently unique to allow at least a majority of calls to be billed.

Preferably, the encoded biometric data is encrypted. The use of encryption to protect data being transmitted is well known in the art of encryption and communication. Any encryption means suitable to the encoded biometric data may be employed. The use of encryption increases the usefulness of the device and method by improving security for financial and legal applications of the technology. Further, the use of encryption enhances personal security by ensuring that biometric data received is from a correct sender and is live biometric data and not data that has been stored for later transmission. Some methods for security encryption require bi-directional communication from the telephone with contact imaging to another phone, switch, or processor having decryption means and capable of supplying the telephone with an encryption key or algorithm for performing the encryption. By requiring encryption to be performed with a receiver's encryption key, security is enhanced.

Figure 7:
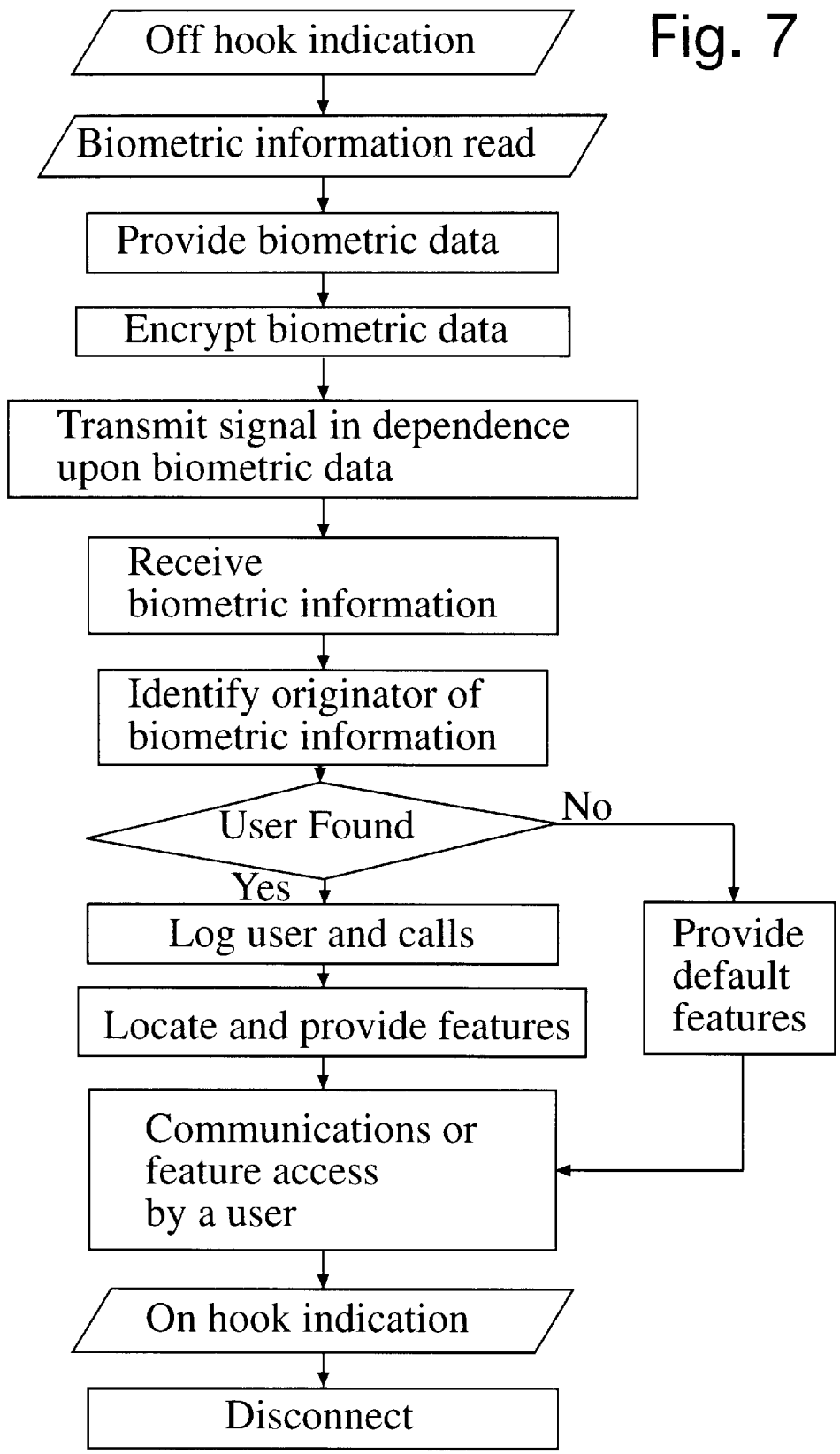
FIG. 7 is a flow chart of a method according to the present invention.

Referring to FIG. 7, a method of enabling telephone features and services according to the present invention is shown. An "off hook" indication is received by a phone switch. The switch may be a central office, a PBX, or any other switch. Such an indication is often provided when a handset is lifted. Alternatively, the indication is provided when a user indicates, for example by pressing a button, a desire to initiate a call. The switch awaits a transmission of encoded biometric data. The encoded biometric data is provided to the switch by a telephone having a biometric sensor added thereto or incorporated therewith.

Upon receipt of the biometric information, the switch searches known user biometric information in an attempt to identify the user. When no match is found, the switch and the telephone remain in a default mode of operation. For instance, voice mail would be unavailable (or only available through current methods of accessing voice mail). When a match is found, the switch retrieves pertinent information to the user of the biometric phone and sets up the phone in a predetermined manner. For instance, settings may include caller ID enabled/disabled, voice mail indicator (message waiting), speed dials, screen calls, phone features, long distance provider, audio volume, and feature/service privileges.

Referring again to FIG. 7, an embodiment of a method according to the invention is shown for a calling feature in the form of call forward. A user, away from their home, desires to have calls forwarded to a nearest phone. The phone may be another private phone, a business phone, a pay phone, or even a cellular phone. The user holds the phone and takes it off hook. A connection is made to a central switch. The user ensures that the contact imaging device has received biometric information. This is accomplished, for example, by placing their fingertip upon a fingerprint scanner incorporated into the phone. The biometric information is encrypted and encoded for transmission. Data in dependence upon the biometric information is transmitted to the central switch. At the central switch or at a processor to which the data is directed by the central switch, the biometric data is received, decrypted, and a user of the phone is identified. Available features for the user are retrieved and provided to the user.

The user then dials an access code for a "call forward" feature. The access code may be in the form of a phone number (e. g. FORWARD) or a feature code (*XX). The processor means identifies phone(s) associated with the user. The features are applied to their phone(s) or transferred therefrom to the current telephone in use by the user. An on hook indication terminates the connection.

A further application of the invention will now be described with reference to a hotel telephone system. Upon registration, each guest registers a finger print with the hotel computer. Guests staying at the hotel or a group of hotels frequently, and who so desire, have their fingerprints stored for future stays. Clearly, once the registration process is complete, hotel rooms, mini bars, vending machines, and so on can be actuated through the use of a contact imaging device providing user identification and thereby allowing for billing. The present invention, requires at least some phones in the hotel and preferably all publicly accessible phones, to have a biometric sensor. A guest using any phone so provided, is identified according to this invention. The hotel guest is provided access to a complete suite of telephone services including wake up calls, concierge, local calls, long distance, check out, etc. via a publicly available phone or another phone with a biometric sensor. The guest no longer need return to their room in order to make a call. Further, a frequent guest can use a phone in a hotel lobby even while not staying at the hotel. Those calls will be billed to the frequent guest separately, either by invoice or to a predetermined credit card.

A salesman, traveling on business, desires the comforts of an office phone. After breakfast a call is typically made from a cellular phone, a pay phone, by requesting use of an outside line at a hotel employee's desk, or by returning to a hotel room. None of these options is truly satisfactory. According to the present invention, the salesman lifts a publicly accessible phone having thereon a biometric sensor, and places a finger tip against the biometric sensor. Biometric information is captured by the sensor, encrypted, encoded, and transmitted to a processor in the hotel or at a phone company. At the processor, the information is decrypted and analyzed against known users. The biometric information is matched against the salesman's biometric template or previously entered biometric information. The identification of the salesman is thereby established.

Once identified, the salesman is provided access to telephone features and services in a predetermined manner. When messages are waiting in the salesman's voice mail box, the telephone tone is altered indicating this. When the salesman dials a number to access the voice mail messages the system responds similarly to an office system. The security inherent in the system can be augmented through password entry to further authenticate a user.

Alternatively, the salesman configures the hotel telephone system to respond differently from an office phone. Further alternatively, the salesman configures phone company preferences such that phone features and speed dials change by location (established by area code), time of day, or some other monitored or enterable criteria.

The method of this invention is also applicable to cellular phones. Individuals enroll their biometric information with a cellular provider. This enrollment process is similar to enrolling a cellular phone, as is currently done. Currently, a user of a registered cellular phone is assumed to be the user who registered the phone. According to the present invention, a cellular phone is provided with a contact imaging means. The biometric input information is transformed into biometric data, encoded, and transmitted to a central switch for identification. Once identified, regardless of the owner of the cellular phone, the call is billed to a currently identified user. Further, features that the user normally has on a cellular phone are provided on any cellular phone once user authentication is complete.

Another application of the present invention is in the area of personal security. A user of a biometric phone according to the invention, is identifiable both as to telephone location (through telephone company information) and identification (based on biometric input information). When a user calls 911 (an emergency number), their file can be accessed regardless of the location from which they are calling. Support lines will benefit from more information to help in counseling and so forth. The identification of an actual caller and not a phone number, also allows for more personalized service when, for example, many different people use the same phone number (as is the case for some companies with PBXs). Further, the identification of a user allows for more effective call screening. Users who do not identify themselves can be filtered as can those users who are not desirable. The use of another person's telephone does not circumvent this feature as presently is the case.

Further, for the purpose of call logging, a phone according to the present invention allows logging of both the originating number and the telephone user. This is useful for billing, legal proceedings, police investigations, call screening (as stated above), and personal security. The logging of all incoming calls based on originating number and biometric information, strongly discourages harassment and other illicit or actionable behaviours using a telephone. Removing anonymity from a caller, substantially ensures fairer use of telephones, in general.

Figure 8:
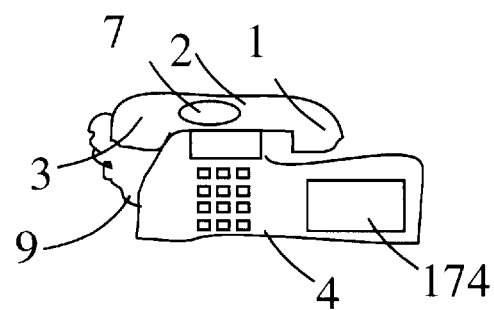
FIG. 8 is a simplified diagram of a telephone with a display incorporated therein and having a contact imaging means according to the present invention.

Referring to FIG. 8, a telephone with a display 17 incorporated therein and having a contact imaging means 7 is shown. The display 17 is useful in electronic commerce, for example, in verifying invoices and authorizing payments. The display 17 is also useful in providing information such as account balances from a bank, flight information from a travel agent, billing information from a service provider, test results from hospitals and medical doctors, etc. Unfortunately, many of the above noted items are of a highly confidential nature and current password protection systems are likely not sufficiently secure. The incorporation of a contact imaging means 7 into such a phone, enhances security (when used with a password) or makes security transparent to a user of such a system (when used without a password). There exists a very small likelihood of error in identifying a user and this likelihood of error is expected to decrease significantly over upcoming years. As such, the use of biometric information for user identification in order to provide access via a telephone having therein a display means, improves security and ease of use.

Further, a telephone with an incorporated LCD display is useful with personal agent technologies. Many products are now being announced that actively fulfill requests made by a user. The requests are in the form of booking airline tickets within certain requirements, ordering flowers, purchasing electronic equipment, finding a cheapest long distance carrier for a call, etc. Using an LCD display and a telephone keypad, a user can enter their requirements. This is possible at any telephone once user identification has been established as is provided using a telephone with contact imaging means according to this invention. The requirements are associated with the user and not with the telephone. Therefore, a user who, for instance, forgot to buy flowers for an upcoming anniversary, can set requirements at any LCD display phone—in a hotel lobby, at a payphone, at the office, etc. and have billing, address and other previously stored personal information available as if the user were at their own LCD display phone. This greatly expands the usefulness and ease of use for personal agents across public (or private) telephone networks.

Yet another use of the present invention is in electronic commerce. Recently, the proliferation of credit cards, computers, and efficient delivery providers has allowed mail order businesses to flourish. Generally, a purchaser desirous of purchasing a product from a mail order business calls the business phone number (often toll free), indicates a catalogue number or identifies the product to a sales representative, and provides address and credit card information. Security in such a system is afforded by the address of the receiver being recorded and the credit card number being authorized.

Figure 9:
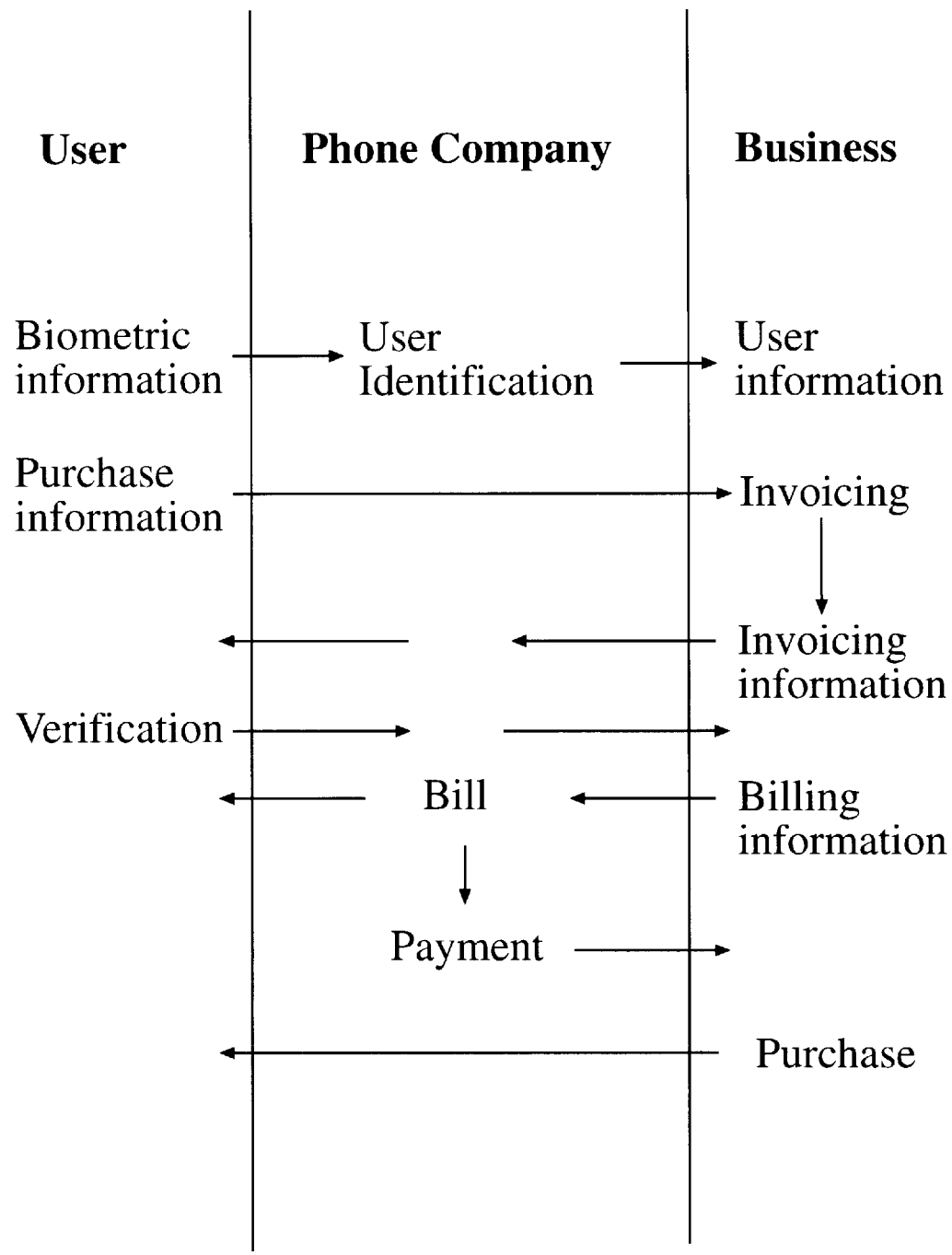
FIG. 9 is an information flow diagram of a method according to the present invention for carrying out electronic commerce.

Referring to FIG. 9 and according to the present invention, a method of providing electronic commerce services is disclosed wherein a user is identified and authenticated by a processor at a central switch. The user identification is transmitted to a business from which a product is to be purchased. The business transmits to the switch or to a central office, information regarding the invoice. This information is verified by the purchaser prior to final authorization and completion of the sale. The purchaser may have the product name and invoice amount read out to them or some other acceptable verification. Alternatively, the purchaser verifies with the vendor and then must check their invoice when the product and invoice arrive.

Upon final authorization by the purchaser, a credit card company, a bank, a financial institution, or another company such as a phone company pays the business for the product and bills the purchaser and the product is shipped to the purchaser. In this way, many common purchases available through telephone services become available to be billed directly to credit card or more conveniently to a phone bill. These services may include concert tickets, food delivery (pizza), mail order purchases, hotel reservations, wired money, airline tickets, etc. When billed by a phone company, an added element of security is provided as no financial or credit card related information is provided to the seller. The phone company also verifies the user identification to limit fraud.

Figure 10:
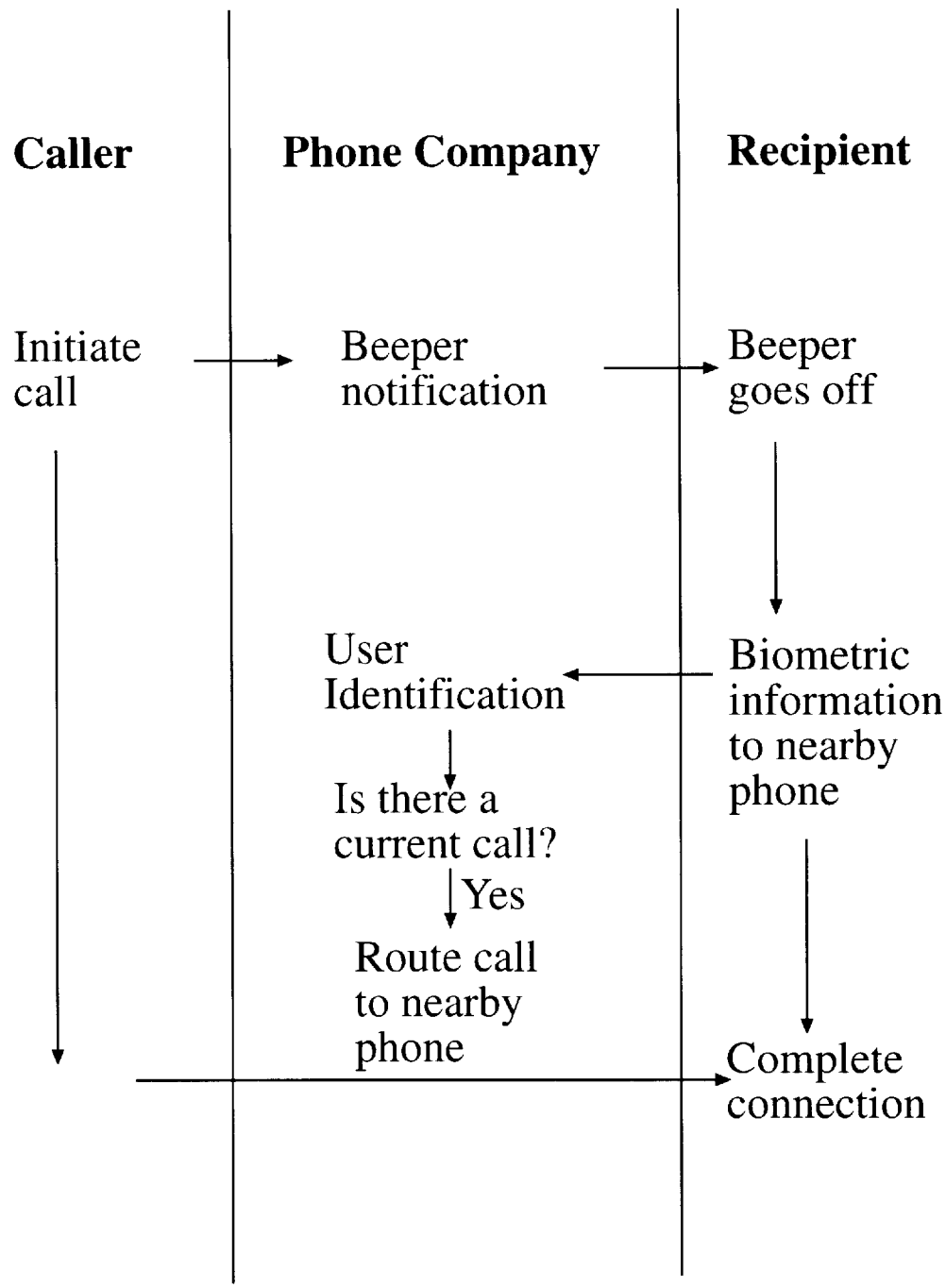
FIG. 10 is an information flow diagram of a method for receiving calls at any telephone through the use of a pager and a contact imaging telephone according to the invention.
Figure 11:
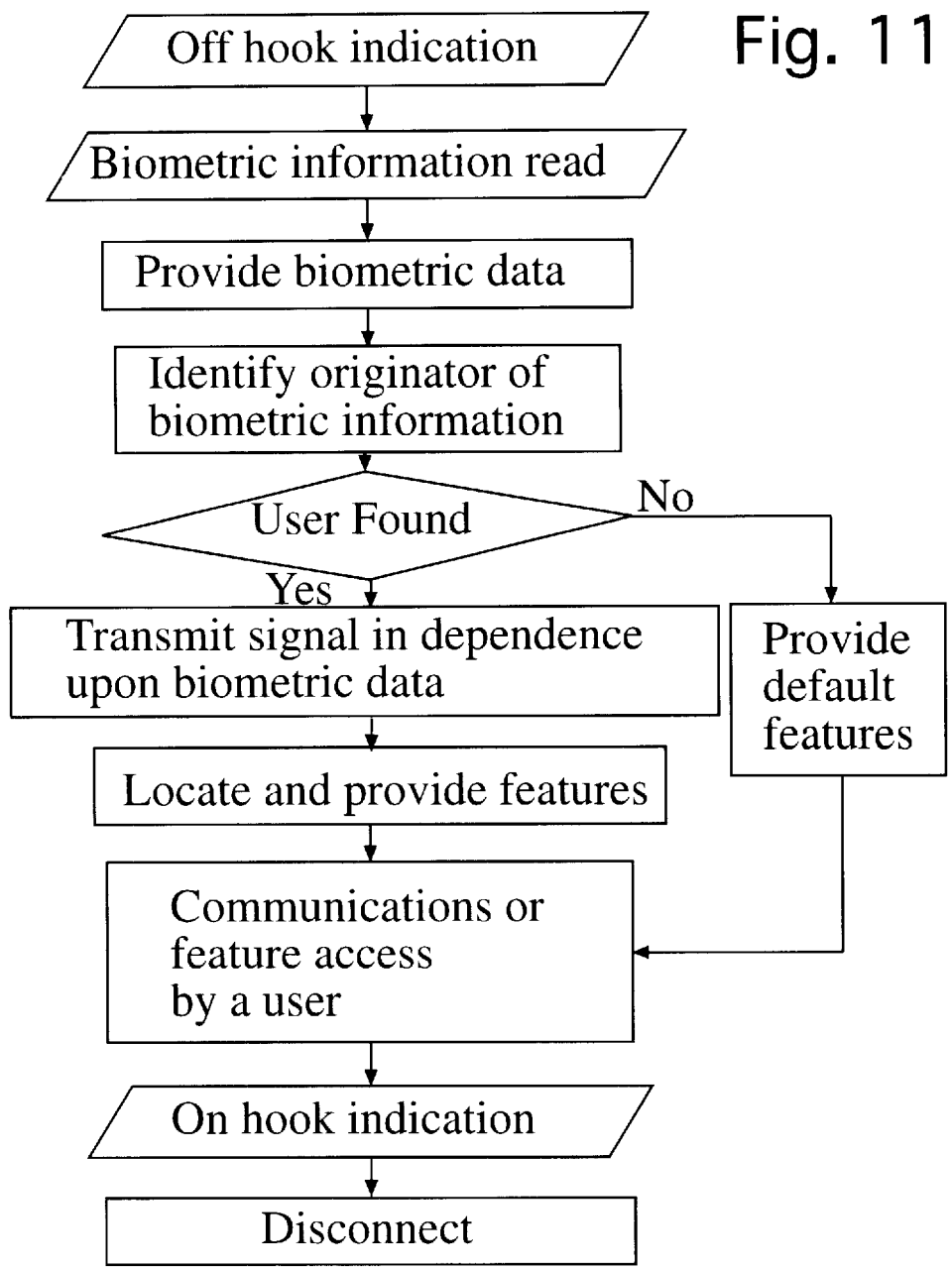
FIG. 11 is a flow chart of a method according to another embodiment of the present invention.
Figure 12:
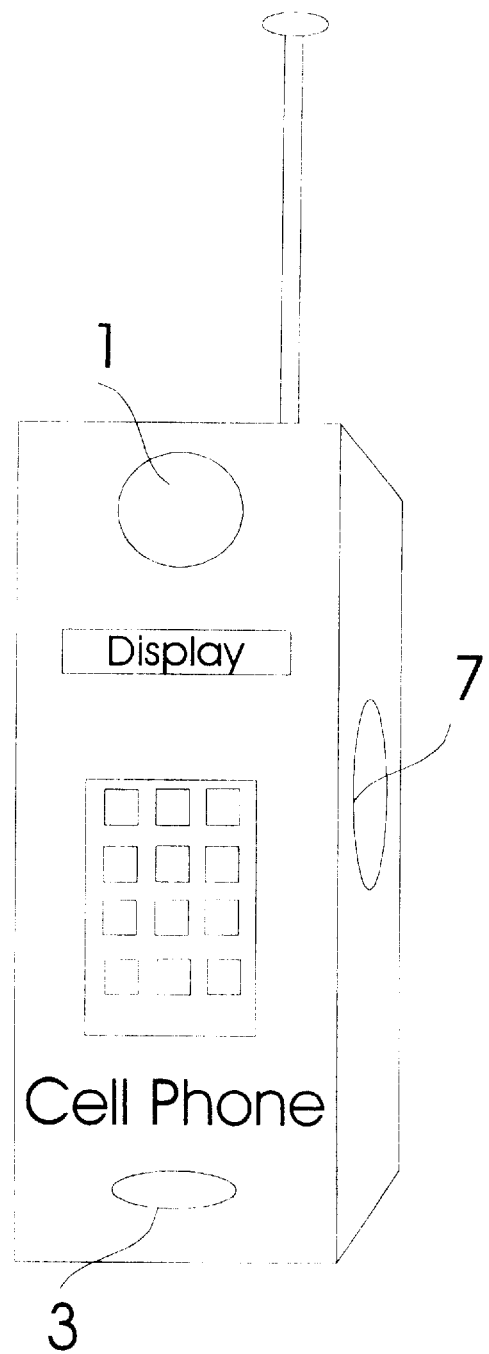
FIG. 12 is a simplified diagram of a cellular phone with a biometric input thereon.

In yet another embodiment, shown in FIG. 10, a method according to the present invention is employed to provide telephone calls to a person wherever they are. A person using this method carries a beeper or other call indication device. A caller initiates a call to the user or recipient. Once a phone call for the recipient is initiated, the central switch or other source causes the beeper to indicate the presence of the call. Should the user wish to answer the call, the user provides biometric information to a nearby telephone, lifting it off-hook. The biometric information is transmitted to a central switch, a processor, a phone company, or another recipient that identifies the user. A search is conducted for incoming calls to that user and when an incoming call is found, the call is routed to the nearby phone. Alternatively, the biometric information is provided without lifting the telephone off-hook. In this latter embodiment, the telephone is caused to ring to indicate that the call has been successfully transferred. In a further embodiment, the same concept is employed within an office and a PA system indicates an incoming call for an individual. When the individual provides biometric information to a communication device within the office, the incoming call is routed to the individual's location.

Another application of the device according to this invention is in the registration of phone calls. When communication is conducted and one wishes to ensure the identity of the receiver, a common mode of communication is registered mail. A registered letter addressed to a recipient requires the signature of the recipient prior to delivery of the letter. A card with the recipient's signature is optionally returned to a sender. Identifying and authenticating the recipient of a phone call has heretofore been difficult if not impossible for use in legal or other official proceedings. Using a telephone provided with a contact imaging means according to this invention, a recipient's identification is established. Therefore, using such a device allows for registered phone calls where the recipient is identified and authenticated and a statement to this effect is transmitted from the phone company or network provider to an initiator of a registered phone call.

In another embodiment, the invention comprises a telephone provided with a contact imaging means wherein a user is verified by circuitry within the phone and access to telephone services and features is provided in dependence upon user verification. A phone according to this embodiment is adapted to work with existing telephone systems and networks including cellular telephones, car phones, digital phones, and analogue phones. Referring to FIG. 1 la flow diagram is shown for the embodiment.

A user places a finger tip on the contact imaging means and biometric information is captured. Biometric data in dependence upon the biometric information is provided to a comparator means in the form of a processor. The comparator means analyzes the biometric data for identifiable features and compares predetermined features against those of biometric templates stored in non-volatile memory. The comparator means analyzes the biometric data for identifiable features and compares predetermined features against those of biometric templates stored in non-volatile memory. When an exact match is found, the processor reads a list corresponding to features and associated with the matching biometric template. Those features are enabled, while other features remain disabled. Some features that are enabled in dependence upon user identification include long distance calling, voice mail, external line access, night time access/daytime access, call forwarding, and operator access. When no match is found, the telephone is disabled or set to a default mode of operation. Alternatively, when an exact match is found, the telephone is enabled for communications. Alternatively, when no match is found, the telephone is disabled.

Numerous other embodiments may be envisaged without departing from the spirit and scope of the invention.

What I claim is:

1. A method of registering a communication between a first telephone, operated by an initiator of a registered communication, and a second telephone operated by a recipient of a registered communication, and for communication via a network comprising the steps of:

a) prompting the recipient of a registered communication for biometric information of a registered communication;

b) the recipient providing input biometric information to a biometric input means;

c) encoding the input biometric information to provide encoded biometric information;

d) providing a signal to the network in dependence upon the encoded biometric information;

e) receiving the signal at a processor within the network;

f) using the processor, analyzing the signal to establish an identification of the recipient;

g) storing information relating to the identification of the recipient and the communication for later retrieval; and, h) providing the stored information to the initiator of the registered communication.

2. A method of registering a communication as defined in claim 1 wherein the information relating to the recipient and the communication comprises recipient's name, biometric information, a source telephone number, a destination telephone number, a time of the communication, a duration of the communication, and a recording of the communication.

3. A method of registering a communication as defined in claim 1 wherein biometric information comprises fingerprint information.

* * * * *